(12) United States Patent
Ia Grone et al.

(10) Patent No.: US 6,768,510 B2
(45) Date of Patent: Jul. 27, 2004

(54) COLOR CORRECTION FOR RGB

(75) Inventors: Marcus J. Ia Grone, Cushing, OK (US); Eric S. Towers, Stillwater, OK (US)

(73) Assignee: Nomadics, Inc., Stillwater, OK (US)

( * ) Notice: Subject to any disclaimer, the term of this patent is extended or adjusted under 35 U.S.C. 154(b) by 0 days.

(21) Appl. No.: 10/364,567

(22) Filed: Feb. 11, 2003

(65) Prior Publication Data

US 2003/0151675 A1 Aug. 14, 2003

Related U.S. Application Data

(60) Provisional application No. 60/356,600, filed on Feb. 11, 2002.

(51) Int. Cl.[7] .............................................. H04N 9/73
(52) U.S. Cl. .................................................. 348/223.1
(58) Field of Search ................................ 348/273, 339, 348/349, 225.1, 234, 236, 237, 250, 33, 34, 271, 278, 223.1

(56) References Cited

U.S. PATENT DOCUMENTS

| 5,481,300 | A | * | 1/1996 | Motta .......................... 348/203 |
| 5,481,401 | A | * | 1/1996 | Kita et al. .................... 359/353 |
| 5,767,538 | A | * | 6/1998 | Mullins et al. .............. 257/115 |
| 5,905,268 | A | * | 5/1999 | Garcia et al. ............ 250/504 R |
| 6,134,375 | A | * | 10/2000 | Naganawa et al. ............ 386/33 |
| 6,157,408 | A | * | 12/2000 | Etoh ........................... 348/316 |
| 6,208,749 | B1 | * | 3/2001 | Gutkowicz-Krusin et al. ... 382/128 |
| 6,252,659 | B1 | * | 6/2001 | Norita et al. ................ 356/625 |
| 6,456,346 | B1 | * | 9/2002 | Arai .............................. 349/106 |
| 6,501,075 | B1 | * | 12/2002 | Trigiani ....................... 250/302 |
| 6,567,543 | B1 | * | 5/2003 | Shiraiwa et al. ............. 382/167 |
| 6,570,147 | B2 | * | 5/2003 | Smith .................... 250/214 VT |

\* cited by examiner

Primary Examiner—Vu Le
Assistant Examiner—Nelson Hernandez
(74) Attorney, Agent, or Firm—Dunlap, Codding & Rogers, P.C.

(57) ABSTRACT

A camera, comprising at least one photodetector, and a light directing device. The light directing device separates light of a wavelength from about 360 nm to about 420 nm to form an NUV component and directs the NUV component to the at least one photodetector whereby the photodetector receives the NUV component and forms a red correction signal.

14 Claims, 2 Drawing Sheets

COLOR CORRECTION FOR RGB

CROSS REFERENCE TO RELATED APPLICATIONS

The present application claims priority under 35 U.S.C. §119(e) to the provisional patent application identified by Application No. 60/356,600, which was filed on Feb. 11, 2002, the entire content of which is hereby incorporated herein by reference.

STATEMENT REGARDING FEDERALLY SPONSORED RESEARCH AND DEVELOPMENT

Not applicable.

BACKGROUND OF THE INVENTION

Normal digital cinema and video cameras have noticeable color-correction problems when dealing with sunlight versus florescent lights versus incandescent lights. These issues are compounded when one attempts to move from one lighting style to another (i.e., transition from indoors to outdoors).

In normal RGB space, purple is the mix of red and blue. Yet, if one looks at a spectrum, 370–415 nanometers appears as violet or purple. This means that a corrected "red" receptor should actually have a slight cross-sensitivity at these wavelengths. No commercial camera, to our knowledge, does this. When one views a 400 nanometer source, commercial cameras map this to blue.

Professionals always check the white balance of their cameras. Indeed, the most common adjustment is fluorescent versus incandescent. If one does not "balance" the camera, the resulting image will look unnaturally blue. This is because the cameras are sensitive in the violet but fail to "add" signal into red. In accordance with the present invention, by accounting for the redness of short wavelengths, cameras would be more accurate and would be able to change lighting conditions quickly without the normal color shift one normally observes in sunlight/incandescent/fluorescent light. It is to such an improved camera that the present invention is directed.

DETAILED DESCRIPTION OF THE INVENTION

Figure 1:
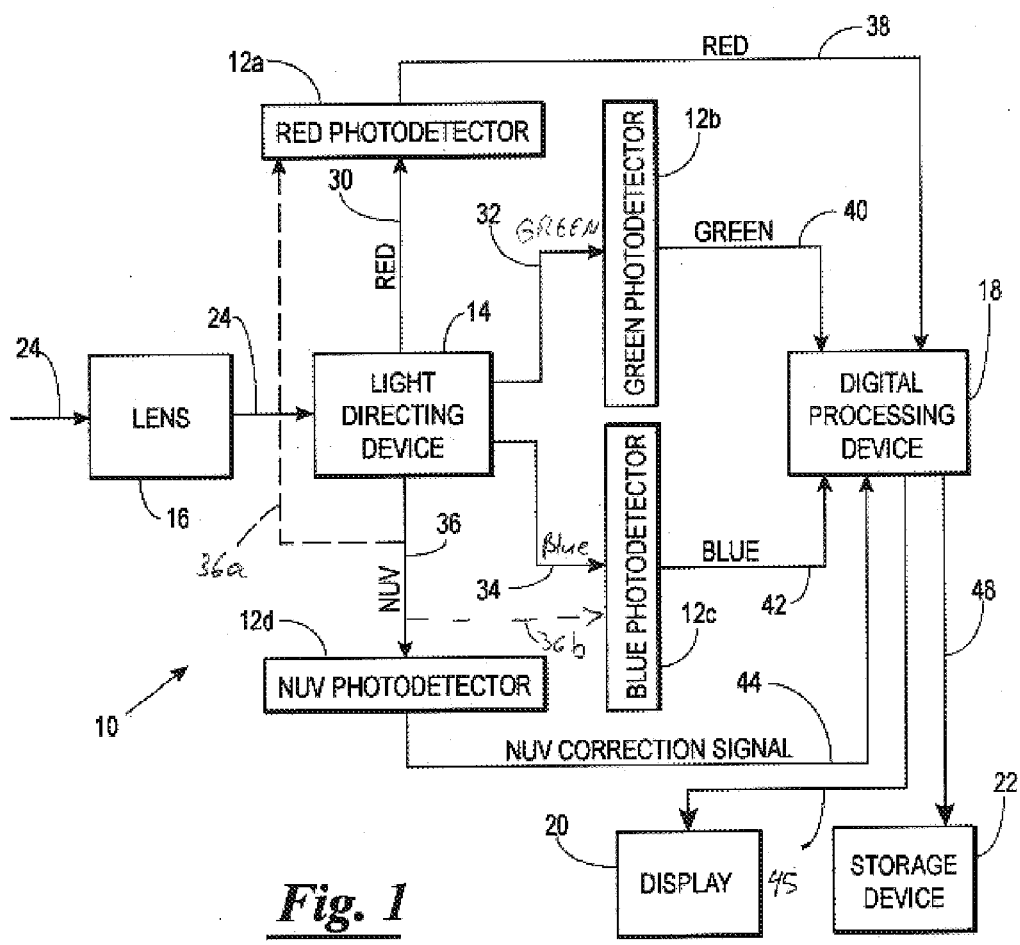
FIG. 1 is a diagrammatic view of a camera constructed in accordance with the present invention.

Referring now to the drawings, and in particular to FIG. 1, shown therein and designated by a reference numeral 10, is a diagrammatic view of a camera constructed in accordance with the present invention. The camera 10 is adapted to filter or otherwise separate light received by the camera 10 into a near-ultraviolet light and use the near-ultraviolet light to provide a color correction for the camera 10. Thus, the camera 10 is typically more accurate than other digital cameras and is able to change lighting conditions without the color shift one normally observes. Thus, in one preferred embodiment, the camera 10 is not required to be "balanced" by the user.

The camera 10 is provided with one or more photodetectors 12, a light directing device 14, a lens 16, a digital processing device 18, a display 20 and a storage device 22. Shown in FIG. 1, for purposes of clarity, are four of the photodetectors 12, which are designated with reference numerals 12a, 12b, 12c, and 12d. The photodetectors 12a, 12b, 12c and 12d have also been labeled in FIG. 1 as a "red" photodetector, "green" photodetector, "blue" photodetector, and "NUV" photodetector, for purposes of clarity and to illustrate the invention being used as a four-channel RGB system. However, it should be understood that the invention is not limited to a four-channel RGB system. That is, other numbers of channels, such as one, two, three, or five can be used. Furthermore, the present invention is not limited to an RGB color scheme. The present invention is equally applicable to other types of color schemes such as CMY, CMYK, or YCrCb.

In use, the lens 16 receives light 24 indicative of an image, and then focuses the light 24 towards the light directing device 14. In one preferred embodiment, the light directing device 14 is a four-channel color prism which separates the light 24 into four signals with each of the signals having different spectral characteristics. In this embodiment, the light directing device 14 separates the light 24 into a red component 30, a green component 32, a blue component 34, and an NUV component 36. As will be understood by one skilled in the art, the wavelengths forming the red component 30, green component 32, blue component 34, and NUV component 36 can vary widely and may be tailored to individual situations as desired by the designer. However, in one preferred embodiment, the red component 30 generally has a wavelength greater than about 600 nanometers, the green component 32 has a wavelength in the range from about 500 nanometers to about 600 nanometers, the blue component 34 has a wavelength in a range from about 360 nanometers to about 500 nanometers, and the NUV component 36 has a wavelength in a range from about 360 nanometers to about 420 nanometers.

The red photodetector 12a, the green photodetector 12b, the blue photodetector 12c, and the NUV photodetector 12d each receive the respective red component 30, green component 32, blue component 34 and NUV component 36. In response thereto, each of the photodetectors 12a–12d produce electrical signals representative of the light present in the components 30–36 and transmit such electrical signals to the digital processing device 18. Thus, the electrical signal produced by the red photodetector 12a is transmitted to the digital processing device 18 via a signal path 38. The electrical signal produced by the green photodetector 12b is transmitted to the digital processing device 18 by the signal path 40. The electrical signal produced by the blue photodetector 12c is transmitted to the digital processing device 18 by a signal path 42, and the electrical signal produced by the NUV photodetector 12d is transmitted to the digital processing device 18 by a signal path 44. The signal paths 38, 40, 42 and 44 can be any suitable type of communication link such as a printed circuit board, airway communication, radio communication, optical communication, or the like.

The digital processing device 18 is programmed with color processing software which combines the signals received by the red photodetector 12a, green photodetector 12b and blue photodetector 12c to form the image which was present in the light 24. The color processing software also receives the signal from the NUV photodetector 12d and maps such electrical signals to the red and/or blue channels to provide a correction for the image. The corrected image can then be output to the display 20 via a signal path 45, or output to the storage device 22 by a signal path 48. The display 20 can be any type of visual display device, such as an LCD screen, a standard definition television or monitor, or a high definition television or monitor, or the like. The storage device 22 can be any type of computer-readable medium capable of being read by the digital processing device 18, or a separate component therefrom such as a magnetic storage device, optical storage device, random access memory, floppy disk, hard disk, tape, film, or the like.

Three-Photodetector Embodiments

The advantage of the camera 10 having the four channel prism and the NUV photodetector 12d is increased flexibility for the designer. The disadvantage of the camera 10 having the four channel prism is the cost of the four channel prism, as well as the cost of the photodetector 12. To lower the cost of the camera 10, the light directing device 14 can be a three channel prism and in this instance the NUV photodetector 12d can be eliminated. In this instance, the NUV component 36 of the light 24 is transmitted to the red photodetector 12a as represented by a dashed line 36a, or the blue photodetector 12c as represented by a dashed line 36b. The NUV component 36 can be directed to the red photodetector 12a or the blue photodetector 12b by any suitable method. For example, the light directing device 14 can be a prism which is tailored to automatically add the NUV component 36 to the red component 30 or the blue component 34.

When the NUV component 36 is directed to the red photodetector 12a, generally the red photodetector 12a can be unmasked. However, when the NUV component 36 is directed to the blue photodetector 12c, a filter mask 46 is positioned between the light directing device 14 and the blue photodetector 12c.

Figure 2:
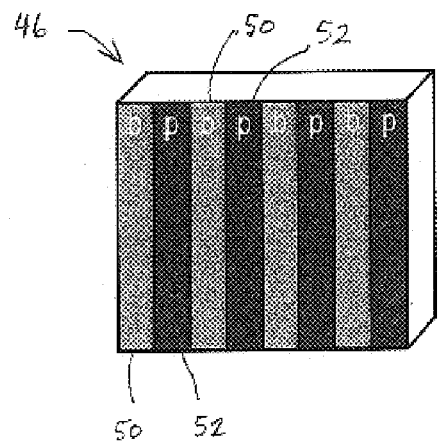
FIG. 2 is a perspective view of a photodetector having a filter mask, constructed in accordance with the present invention, positioned thereon, wherein the filter mask is used in a three-photodetector system.

Referring now to FIG. 2, in combination with FIG. 1, the filter mask 46 has a predetermined pattern formed by one or more filtering regions 50 for only passing the blue component 34 and one or more filtering regions 52 for only passing the NUV component 36. p The filter mask 46 can be implemented in many different ways. For example, as shown in FIG. 2, the filter mask 46 can be applied directly onto the photo detector 12c such as by photolithography techniques, ink jet printing techniques, or other manners of applying or printing a shadow mask to the photo detector 12c. Alternatively, the filter mask 46 can also be implemented as a transparent material, such as glass, having the regions 50 and 52 printed thereon with the transparent material positioned between the light directing device 14 and the photo detector 12c.

The photodetectors 12a, 12b, 12 and 12d can be implemented by any type of light sensitive device capable of receiving light indicative of an image and outputting data indicative of the image. For example, the photodetectors 12a, 12b, 12c and 12d can be implemented as charge-coupled devices (CCDs), CMOS, photodiodes, phototransistors, a Cadmium-Sulfide cell, or a bolometer.

The regions 50 and 52 forming the predetermined pattern of the filter mask 46 can be implemented in many forms. For example, as shown in FIG. 2, the predetermined pattern can be implemented as a plurality of alternating stripes of the regions 50 and 52. In this instance, each of the alternating stripes is applied to the photodetector 12c to create a shadow mask for a predetermined number of pixels on the photodetector 12c. For example, each stripe can be applied to one, two or three, column(s) or row(s) of pixels on the photodetector 12c. Alternatively, the regions 50 and 52 can be provided in a checkerboard pattern.

Single-Photodetector Embodiment

Prior art single-photodetector cameras use a bayer pattern (or other comparable) to develop a color image. A filter mask having a predetermined pattern is printed onto the single photodetector. The prior art filter mask has three regions forming the predetermined pattern. One of the regions pass the red component, one of the regions pass the blue component and one of the regions pass the green component.

Figures 3, 5:
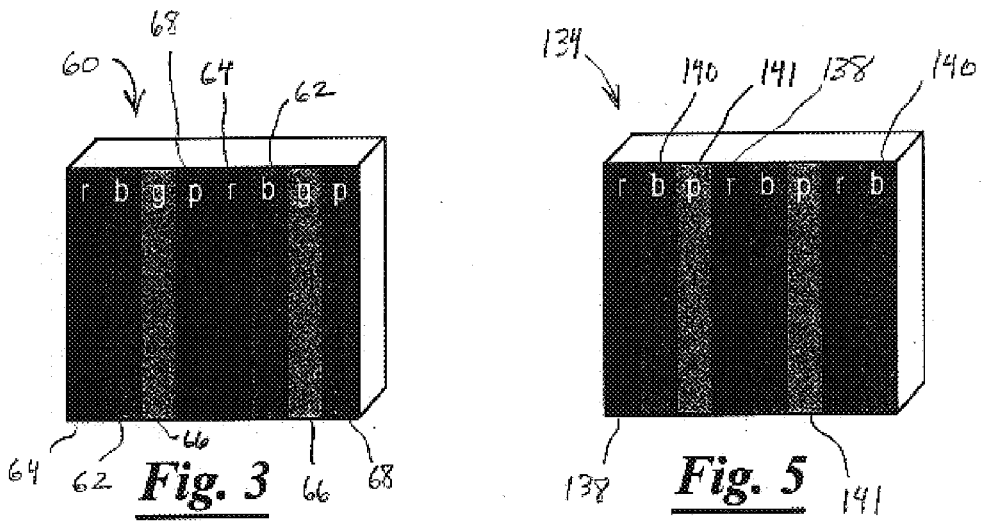
FIG. 3 is a perspective view of a photodetector having a filter mask, constructed in accordance with the present invention, positioned thereon wherein the filter mask is used in a one photodetector system.
FIG. 5 is a perspective view of a photodetector having a filter mask, constructed in accordance with the present invention, positioned thereon wherein the filter mask is used in a two-photodetector system.

Shown in FIG. 3 is a filter mask 60 constructed in accordance with the present invention for use in a single-photodetector camera. The filter mask 60 has a predetermined pattern formed by 1) one or more filtering regions 62 for only passing the blue component 34, 2) one or more filtering regions 64 for only passing the red component 30, one or more filtering regions 66 for only passing the green component 32, and one or more filtering regions 68 for only passing the NUV component 36.

The filter mask 60 can be implemented in many different ways. For example, as shown in FIG. 3, the filter mask 60 can be applied directly onto the photo detector 12 such as by photolithography techniques, ink jet printing techniques, or other manners of applying or printing a shadow mask to the photo detector 12. Alternatively, the filter mask 60 can also be implemented as a transparent material, such as glass, having the regions 62, 64, 66 and 68 applied thereto.

Two-Photodetector Embodiment

Figure 4:
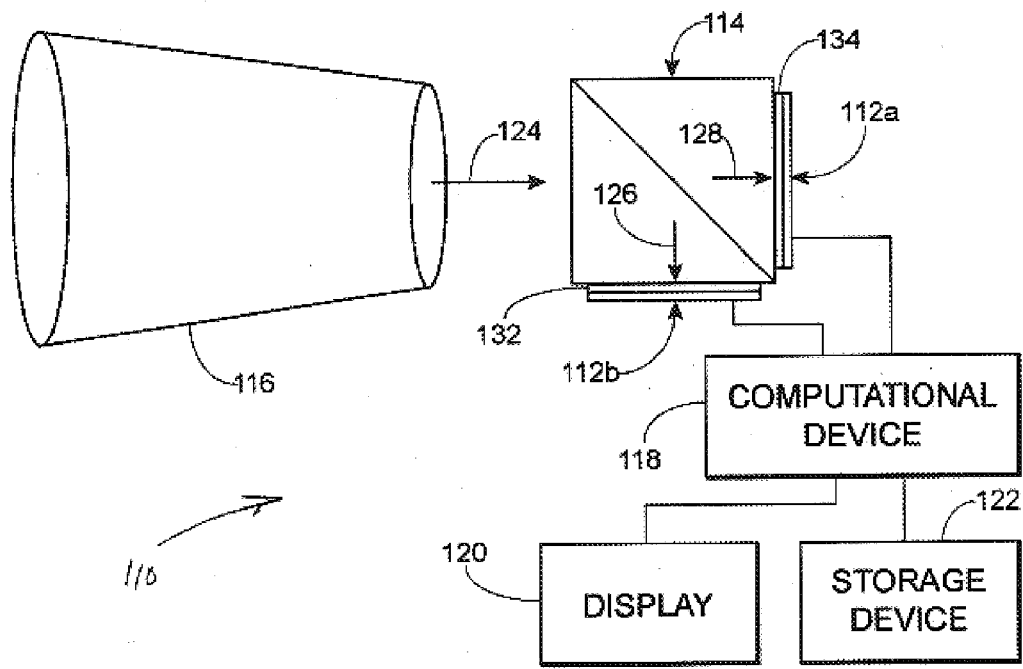
FIG. 4 is a top plan view, partially in diagrammatic form, of a camera constructed in accordance with the present invention.

Referring now to the drawings, and in particular to FIG. 4, shown therein and designated by a reference numeral 110, is a camera constructed in accordance with the present invention. The camera 110 can be used for most video applications due to the way current SD and HD video standards encode the data. In general, the camera 110 is provided with two photo detectors (designated by the reference numerals 112a and 112b), a light directing device 114, a lens 116, a computational device 118, a display 120, and a storage device 122.

The lens 116 of the camera 110 receives light 124 indicative of an image and focuses the light 124 towards the light directing device 114. The construction and use of the lens 116 is well known in the art. Thus, no further comment with respect to the construction and the use of the lens 116 is deemed necessary to teach one skilled in the art how to practice the present invention.

The light directing device 114 receives the light 124 indicative of the image from the lens 116. In response thereto, the light directing device 114 splits or directs the light 124 into a first light beam 126 and a second light beam 128. The light directing device 114 can be a 45° prism with a dichroic mirrors/filters, or a beam splitter.

In one preferred embodiment, the camera 110 is also provided with a first filter mask 132, and a second filter mask 134. The first filter mask 132 receives the first light beam 126 and transmits a first color of light in the first light beam 126 to the photo detector 112b. As will be understood by one skilled in the art, when the light directing device 114 is a prism which separates the first color of light from the light 124, the first filter mask 132 may be eliminated.

Referring now to FIG. 5, in combination with FIG. 4, the second filter mask 134 has a predetermined pattern formed by one or more filtering regions 138 of a second color, one or more filtering regions 140 of a third color, and one or more filtering regions 141 for passing the NUV component. The second filter mask 134 receives the second light beam 128 and transmits light of the second color, the third color, and the NUV component in the second light beam 128 to the photo detector 112a.

The second filter mask 134 can be implemented in many different ways. For example, as shown in FIG. 5, the second filter mask 134 can be applied directly onto the photo detector 112a such as by photolithography techniques, ink jet printing techniques, or other manners of applying or printing a shadow mask to the photo detector 112a. Alternatively, the second filter mask 134 can also be implemented as a transparent material, such as glass, having the regions 138, 140 and 141 printed thereon with the transparent material positioned between the light directing device 14 and the photo detector 112a.

The photodetectors 112a and 112b can be implemented by any type of light sensitive device capable of receiving light indicative of an image and outputting data indicative of the image. For example, the photodetectors 112a and 112b can be implemented as charge-coupled devices (CCDs), CMOS, photodiodes, phototransistors, a Cadmium-Sulfide cell, or a bolometer.

The regions 138, 140 and 141 forming the predetermined pattern of the second filter mask 134 can be implemented in many forms. For example, as shown in FIG. 5, the predetermined pattern can be implemented as a plurality of alternating stripes of the regions 138, 140 and 141. In this instance, each of the alternating stripes is applied to the photodetector 112a to create a shadow mask for a predetermined number of pixels on the photodetector 112a. For example, each stripe can be applied to one, two or three, column(s) or row(s) of pixels on the photodetector 112a. The predetermined pattern can also be implemented in the form of a checkerboard.

In one preferred embodiment, the camera 110 can be characterized as a 4:2:2 RGB camera. In this instance, the first color is "green", the second color is "red" and the third color is "blue". The photodetector 112b is devoted to what is commonly referred to in the art as the "green" channel of the 4:2:2 RGB camera. In one preferred embodiment, the photodetector 112b is entirely devoted to the "green" channel. The photodetector 112a forms both the red and blue channels of the 4:2:2 RGB camera. By using a two-photodetector 112a and 112b arrangement, one for the "green" channel and one that shares both the "red", "blue" and NUV channels, one can capture images with the sharpness of a three CCD camera with no worse color depth than the normal video standard. This permits fewer CCDs and less expensive optics for the same apparent quality.

Using 2 photodetectors 112a and 112b also permits one to use a simple 45° degree prism with dichroic mirrors/filters (i.e., the light directing device 14). This makes manufacture easier, alignment easier and light throughout higher.

A variation would be to let the "green" CCD filter see some of the red and blue. Thus, one would have a YRB camera. The advantage: easier, more accurate conversion to YCrCb space. Work has been done previously with WRB (white, red, blue) cameras on single CCDs and the results were not desirable as the "white" areas received much more light than the other areas, making it difficult to balance the signal levels. By doing this on two separate channels, balance and "bleedover" from adjacent pixels that plagued single CCD WRB cameras is eliminated. As the Y (or W) channel is the one humans are most sensitive to, the fact that more energy is on a single CCD means its signal-to-noise ratio will be much improved at only a minor expense to the red and blue channels.

Other variations one could use would be to use Cyan and Yellow rather than blue and red filters.

Furthermore, improved three-photodetector cameras can be constructed using the concepts described above for the two-photodetector camera. For example, a three-photodetector camera can be constructed using one photodetector dedicated to the green channel, one photodetector dedicated to the red and blue channels, and one photodetector dedicated to the NUV channel. Alternatively, the three-photodetector camera can be constructed with one photodetector dedicated to the red channel, one photodetector dedicated to the green channel, and one photodetector dedicated to the blue and NUV channels. Further, the three-photodetector camera can be constructed with one photodetector dedicated to the red and NUV channels, one photodetector dedicated to the green channel, and one photodetector dedicated to the blue channel.

Background:

YCrCb is (approx.) Y=green+some red and some blue (Luminance),

Cr=Red−Y, Cb=Blue−Y

4:4:4 refers to the sampling of YCrCb where Y, Cr and Cb all get equal sampling.

4:2:2 sampling is where Y gets full sampling but Cr and Cb are only sampled at half the base rate across the image. As a result, if you have:

720×480 4:4:4 RGB 720×480 Red, 720×480 Green and 720×480 Blue

720×480 4:4:4 YCrCb 720×480 Y, 720×480 Cr, 720×480 Cb

720×480 4:2:2 YCrCb 720×480 Y, 360×480 Cr, 360×480 Cb

Changes may be made in the embodiments of the invention described herein, or in the parts or the elements of the embodiments described herein or in the step or sequence of steps of the methods described herein, without departing from the spirit and/or the scope of the invention as defined in the following claims.

What is claimed is:

1. A camera, comprising:
   at least one photodetector;
   means for separating light of a wavelength from about 360 nm to about 420 nm to form an NUV component and directing the NUV component to the at least one photodetector whereby the photodetector receives the NUV component and forms a red correction signal.

2. The camera of claim 1, wherein the at least one photodetector is a charge-coupled device.

3. The camera of claim 1, wherein the at least one photodetector is characterized as a blue photodetector, and wherein the camera further comprises a filter mask associated with the blue photodetector, the filter mask having a predetermined pattern for passing a blue component of the light, and the NUV component of the light.

4. The camera of claim 3, wherein the predetermined pattern of the filter mask is in a form of alternating stripes.

5. The camera of claim 1, wherein the camera is characterized as a 4:2:2 camera.

6. The camera of claim 1, wherein the at least one photodetector is characterized as a red photodetector receiving both a red component of the light as well as the NUV component of the light.

7. A camera, comprising:

two photodetectors;

a prism receiving light indicative of an image and for splitting the light into a first light beam and a second light beam, the first light beam being a first color and being directed to one of the photodetectors;

a filter mask having a predetermined pattern formed by one or more filtering regions of a second color, one or more filtering regions of a third color, and one or more filtering regions for passing the NUV component, the filter mask receiving the second light beam and transmitting light of the second and third colors, and the NUV component to the other one of the photodetectors.

8. The camera of claim 7, wherein at least one of the photodetectors is a charge-coupled device.

9. The camera of claim 7, wherein the predetermined pattern of the filter mask is in a form of a checkerboard.

10. The camera of claim 7, wherein the predetermined pattern of the filter mask is in a form of alternating stripes.

11. The camera of claim 7, wherein the camera is characterized as a 4:2:2 camera.

12. The camera of claim 7, wherein the first color is green, the second color is blue and the third color is red.

13. The camera of claim 7, wherein the first color, second color and third color represent YcrCb.

14. The camera of claim 7, wherein the first color is white.

* * * * *

UNITED STATES PATENT AND TRADEMARK OFFICE
CERTIFICATE OF CORRECTION

PATENT NO. : 6,768,510 B2
DATED : July 27, 2004
INVENTOR(S) : Marcus J. laGrone et al.

It is certified that error appears in the above-identified patent and that said Letters Patent is hereby corrected as shown below:

Title page,
Item [75], Inventors, after "Marcus J.", change the name "Ia" to the name -- la -- with a lower case L.

Column 3,
Line 48, number "36. p" change to number -- 36. --
Line 48, number "36. p" change to number -- 36b --.
Line 59, number "12a" should be deleted.

Column 4,
Line 13, word "bayer" should be -- Bayer --.

Column 6,
Lines 58 and 60, after the word "wherein" word "the" should be deleted.

Column 7,
Line 3, after the word "wherein" word "the" should be deleted.

Column 8,
Line 14, the acronym "YcrCb" the C's should read -- YCrCb --.

Signed and Sealed this

Ninth Day of November, 2004

JON W. DUDAS
*Director of the United States Patent and Trademark Office*